US 008749702B2

(12) United States Patent
Alm

(10) Patent No.: US 8,749,702 B2
(45) Date of Patent: Jun. 10, 2014

(54) NETWORK CAMERA ASSEMBLY

(75) Inventor: Carl-Axel Alm, Lund (SE)

(73) Assignee: Axis AB, Lund (SE)

( * ) Notice: Subject to any disclaimer, the term of this patent is extended or adjusted under 35 U.S.C. 154(b) by 504 days.

(21) Appl. No.: 12/323,927

(22) Filed: Nov. 26, 2008

(65) Prior Publication Data

US 2009/0141143 A1   Jun. 4, 2009

Related U.S. Application Data

(60) Provisional application No. 60/990,995, filed on Nov. 29, 2007.

(30) Foreign Application Priority Data

Nov. 29, 2007   (EP) ..................................... 07121870

(51) Int. Cl.
*H04N 5/225*   (2006.01)
*H04N 5/235*   (2006.01)
*G03B 17/00*   (2006.01)

(52) U.S. Cl.
USPC .......................... 348/373; 348/222.1; 396/427

(58) Field of Classification Search
USPC ............................. 348/373, 143; 396/419, 433
See application file for complete search history.

(56) References Cited

U.S. PATENT DOCUMENTS

| 5,223,872 | A | * | 6/1993 | Stiepel et al. ................. 396/427 |
| 5,394,209 | A | | 2/1995 | Stiepel et al. |
| 5,627,616 | A | | 5/1997 | Sergeant et al. |
| 5,808,679 | A | | 9/1998 | Shih |
| 6,462,781 | B1 | | 10/2002 | Arnold |
| 6,628,338 | B1 | | 9/2003 | Elberbaum et al. |
| 6,793,414 | B2 | * | 9/2004 | Akada ............................ 396/427 |
| 6,793,415 | B2 | * | 9/2004 | Arbuckle ....................... 396/427 |
| 6,992,723 | B1 | | 1/2006 | Wulf et al. |
| 2002/0171557 | A1 | | 11/2002 | Wegener |
| 2004/0070684 | A1 | | 4/2004 | Horigome |
| 2005/0052569 | A1 | | 3/2005 | Ibaraki et al. |
| 2006/0104633 | A1 | | 5/2006 | Kenoyer et al. |
| 2007/0041727 | A1 | * | 2/2007 | Lee ............................... 396/427 |

FOREIGN PATENT DOCUMENTS

| EP | 0537468 A | 4/1993 |
| JP | 04108274 | 4/1992 |
| JP | 08139976 A | 5/1996 |
| WO | 2006012524 A2 | 2/2006 |

* cited by examiner

*Primary Examiner* — Joel Fosselman
(74) *Attorney, Agent, or Firm* — Volpe and Koenig, P.C.

(57) ABSTRACT

The invention relates to a network camera comprising an image acquisition part, an image processing part, a flat cable connecting the image acquisition part with a first end of the image processing part, and an inlet for an external data cable arranged at a second end of the image processing part. The image acquisition part is tiltable around a first axis in relation to the image processing part, the image processing part and the image acquisition part in combination are rotatable around a second axis, and the first and second axes are essentially perpendicular to each other.

9 Claims, 4 Drawing Sheets

NETWORK CAMERA ASSEMBLY

This application claims the benefit of European patent application no. 07121870.5 filed on Nov. 29, 2007 and U.S. provisional application No. 60/990,995 filed on Nov. 29, 2007, which is incorporated by reference as if fully set forth.

TECHNICAL FIELD OF THE INVENTION

The present invention relates to a network camera.

BACKGROUND

Dome cameras with tilt and pan functionality are complex and expensive. The mechanical solutions used for enabling tilt and pan functionality of the camera view are bulky and complex.

Since the internal cabling of the camera has to be able to support all possible tilt and pan angles of the camera view relative to the fixed base of the camera, an extra amount of internal cabling is needed. The extra amount of cabling is not only expensive but also space-requiring, which results in rather large dome cameras. This large size of the dome cameras constitutes a problem since pan and tilt dome cameras are often installed where space is limited.

SUMMARY OF THE INVENTION

The object of the invention is to provide a small dome network camera that is cost-efficient to manufacture.

The above objects are achieved according to a first aspect of the invention by means of a network camera comprising an image acquisition part, an image processing part, and a flat cable. The flat cable connects the image acquisition part with a first end of the image processing part. The network camera further comprises an inlet for an external data cable arranged at a second end of the image processing part. The image acquisition part is tiltable around a first axis in relation to the image processing part, the image processing part and the image acquisition part are in combination rotatable around a second axis, and the first and second axes are essentially perpendicular to each other.

This embodiment is advantageous in that the space needed for the cables connecting the image acquisition part with the image processing part is minimized by using a flat cable which enables a slim profile of the camera and minimizes the overall volume of the camera housing at the same time. A further advantage with this embodiment is that it enables rotation of the network camera around the second axis.

Further advantages are that the viewing direction of the network camera is easily tuned and that the cabling is inexpensive. Furthermore, the construction is non-complex, compact, cost-efficient, and the number of mechanical components is minimized.

According to another embodiment, the image processing part further comprises networking capabilities.

According to another embodiment, the network camera further comprises a housing comprising at least one protrusion on an outside of the housing protruding in a plane essentially orthogonal to the second axis.

According to another embodiment, the network camera further comprises a housing comprising, on an outside of the housing, a supporting flange having at least one notch.

The above objects are also achieved according to a second aspect of the invention by means of a network camera assembly, comprising an image acquisition part, an image processing part, and a flat cable connecting the image acquisition part with a first end of the image processing part. The network camera assembly further comprises an inlet for an external data cable arranged at a second end of the image processing part, and a network camera holder arranged to substantially enclose said image processing part. The image acquisition part is tiltable around a first axis and the image processing part is rotatably inserted into the network camera holder. Furthermore, the network camera holder is adapted to enable rotation of the image processing part around a second axis, and the first and second axes are essentially perpendicular to each other.

The advantages of the first aspect are also applicable for the second aspect.

A further advantage with the embodiment is that the network camera holder simplifies the rotation of the image processing part.

According to another embodiment, the image processing part further comprises networking capabilities.

According to another embodiment the network camera assembly further comprises a housing enclosing said image processing part comprising at least one protrusion on an outside of the housing protruding in a plane essentially orthogonal to the second axis. Furthermore, the network camera holder further comprises, on an inside of the network camera holder, a supporting flange having at least one notch, wherein the at least one notch is adapted to receive the at least one protrusion, and wherein the at least one flange is arranged to secure the image acquisition part in the network camera holder. This embodiment is advantageous in that the network camera is easily mounted to the network camera holder.

According to another embodiment, the network camera assembly further comprises a housing enclosing said image processing part comprising, on an outside of the housing, a supporting flange having at least one notch. Furthermore, the network camera holder further comprises, on an inside of the network camera holder, at least one protrusion protruding in a plane essentially orthogonal to the second axis, wherein the at least one notch is adapted to receive the at least one protrusion, and wherein the at least one protrusion is arranged to secure the image acquisition part in the network camera holder. This embodiment is advantageous in that the network camera is easily mounted to the network camera holder.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF AN EMBODIMENT

Figure 1:
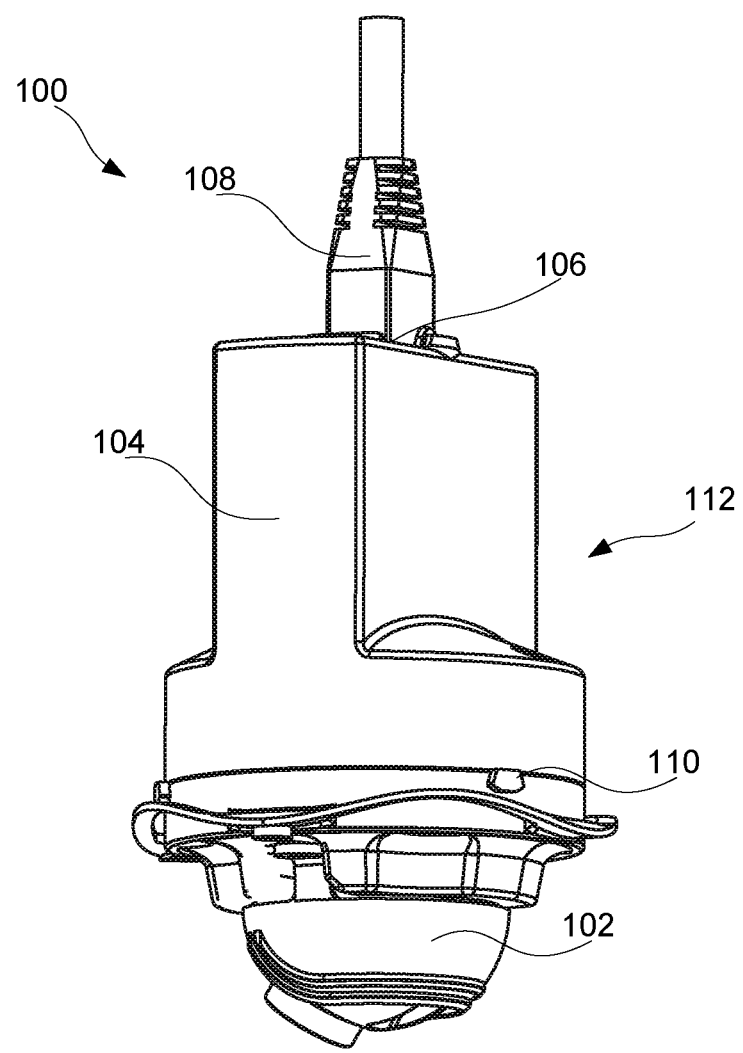
FIG. 1 is a side view of one embodiment of a network camera according to the present invention.

FIG. 1 illustrates a network camera 100 of dome camera type. The network camera 100 has an image acquisition part 102, an image processing part 104, and an inlet for an external data cable 106 arranged at a second end of the image processing part 104. The data cable 108 may be any data cable known to a person skilled in the art, for example a twisted pair or a coaxial cable.

Figures 2A, 2B:
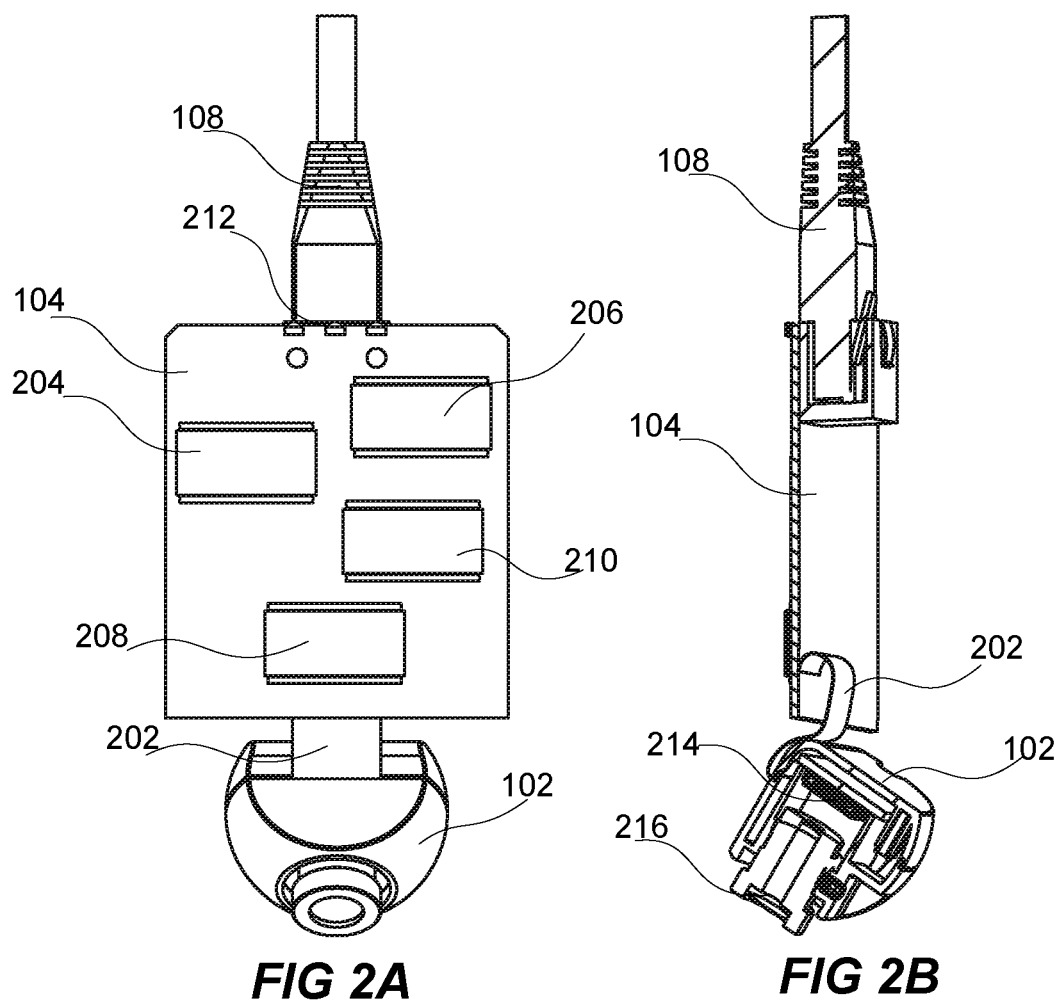
FIG. 2A is a front view of the network camera of FIG. 1 without its housing.
FIG. 2B is a side view of a cross-section of the camera of FIG. 2A.

The image acquisition part 102 and a first end of the image processing part 104 may be connected by a flat cable 202, as shown in FIGS. 2A and 2B. The first end and the second end of the image processing part 104 are essentially opposite to each other. The flat cable 202 is very flexible in one direction and much less flexible, in some cases rigid, in a direction parallel to a plane defined by the flat cable. Furthermore, the flat cable 202 may be of different types, for example a ribbon cable or a flat flex cable. The flat cable 202 may be attached to the image acquisition part 102 and the image processing part 104 by using different techniques, for example soldering or by using cable connectors.

The data cable 108 connects the image processing part 104 with a network, whereby the whole network camera 100 is connected to the network.

As shown in FIG. 2A, the image processing part 104 may comprise an image compression unit 208, a CPU (Central Processing Unit) 210, an Ethernet interface 212, a non-volatile memory, such as a Flash memory 204, and a volatile memory, such as a DRAM (Dynamic Random Access Memory) 206.

As shown in FIG. 2B, the image acquisition part 102 may comprise an image sensor 214 and a lens package 216.

Figure 3A:
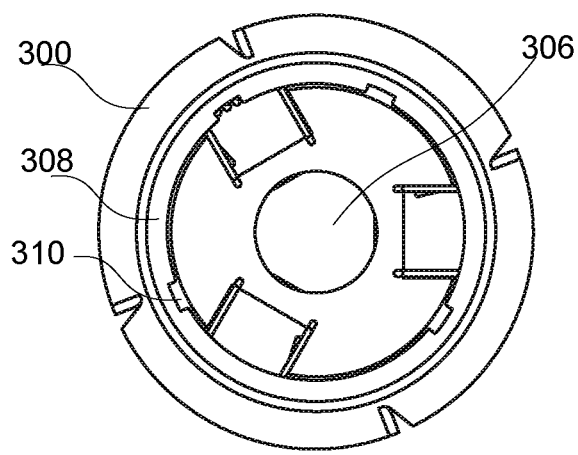
FIG. 3A is a bottom view of a network camera holder.
Figure 3B:
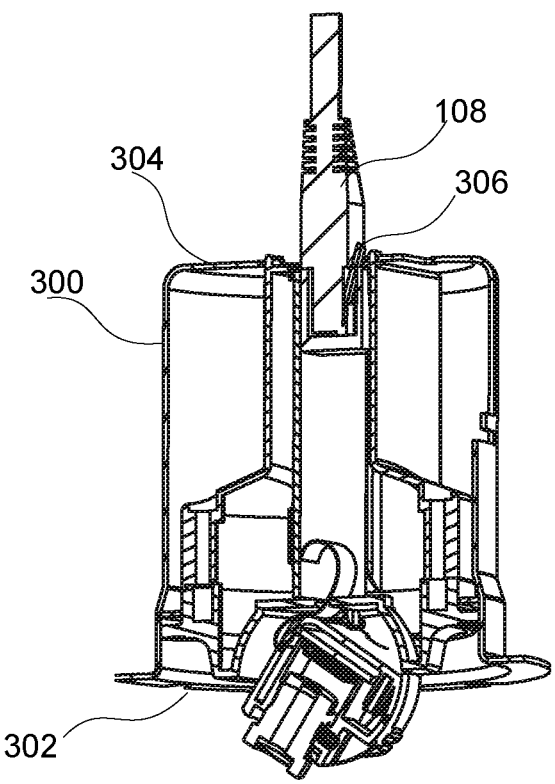
FIG. 3B is a side view of a cross-section of the network camera of FIG. 2A inserted into the network camera holder of FIG. 3A.
Figure 4:
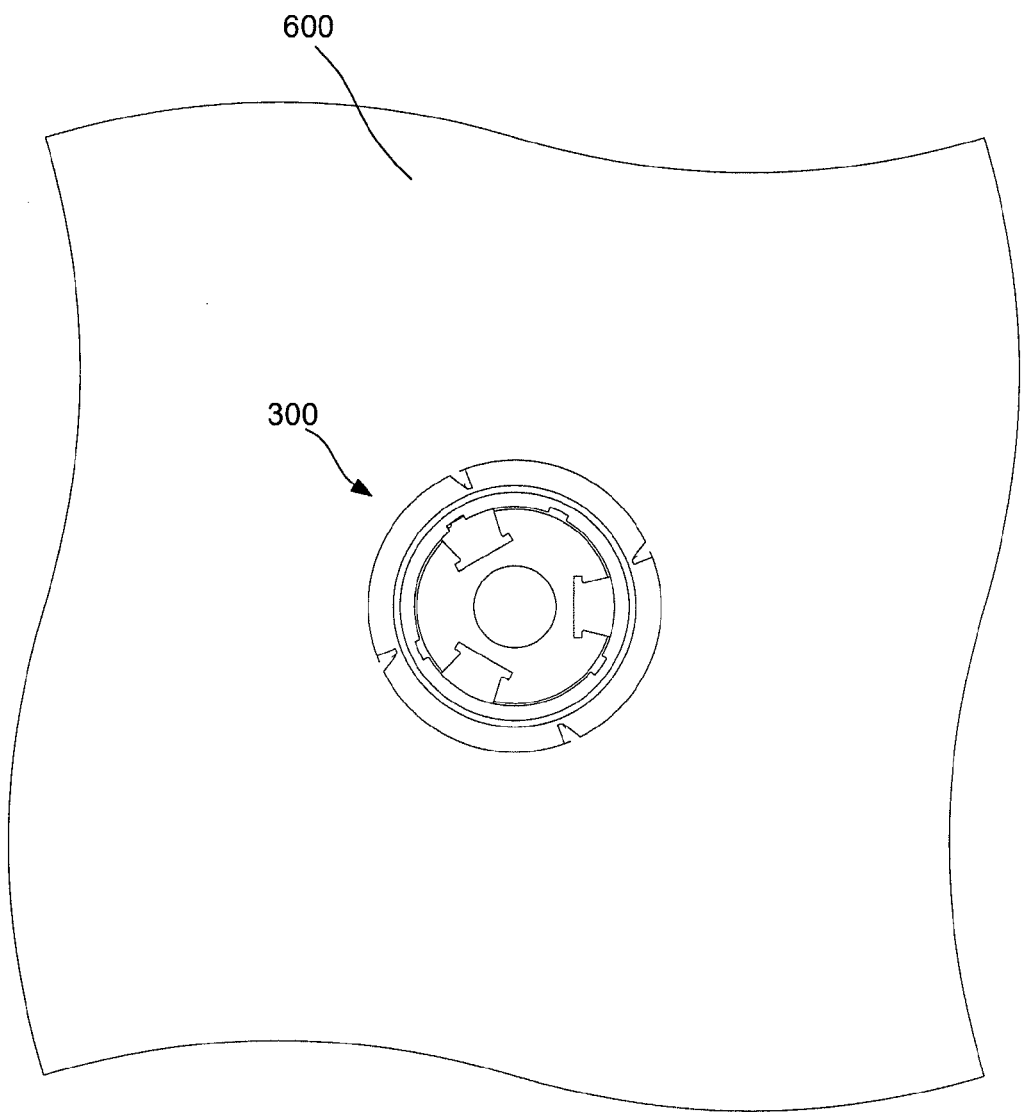
FIG. 4 is a bottom view of the network camera holder of FIG. 3A, attached to a panel element.

The network camera 100 may have a housing 112 comprising at least one protrusion 110, as shown in FIG. 1. In case of a plurality of protrusions 110, the plurality of protrusions 110 are arranged on an outside of the housing 112 along a circumference enclosing the center axis of the network camera. The at least one protrusion 110 may be used for attaching the network camera 100 to a network camera holder 300, as illustrated in FIGS. 3A and 3B. The network camera holder 300 may be attached to a panel element 600, as shown in FIG. 4.

Alternatively, the housing 112 of the network camera 100 may comprise on an outside of the housing 112, a supporting flange having at least one notch. The at least one notch may be used for attaching the network camera 100 to a network camera holder 300 and the network camera holder 300 may be attached to a panel element.

The network camera holder 300 is arranged to receive the network camera 100. The network camera holder 300 may be of cylindrical shape. The network camera holder 300 has a first, open end 302 and a second end 304. An opening 306 is arranged substantially centrally in the second end. This opening 306 provides easy access for the data cable 108 through the network camera holder 300 to the network camera 100.

The network camera holder 300 further comprises a supporting flange 308 circumferentially arranged inside the network camera holder 300. At least one notch 310 is arranged in the supporting flange 308 of the network camera holder 300. The at least one notch 310 of the network camera holder 300 is adapted to receive the at least one protrusion 110 of the network camera 100 when inserting the network camera 100 into the network camera holder 300.

Alternatively, the network camera holder 300 further comprises at least one protrusion arranged inside the network camera holder 300. In case of a plurality of protrusions, the plurality of protrusions are arranged on an inside of the network camera holder along a circumference enclosing the center axis of the network camera. The at least one notch of the network camera 100 is adapted to receive the at least one protrusion of the network camera holder 300 when inserting the network camera 100 into the network camera holder 300.

After inserting the network camera 100 into the network camera holder 300, the network camera 100 is rotated into position. The supporting flange 308, with the at least one protrusion and/or the at least one notch 310 of the network camera holder 300, secures the network camera 100 to the network camera holder 300.

Prior to inserting the network camera 100 into the network camera holder 300, the data cable 108 may be inserted through the opening 306 and may be connected to the network camera 100.

Due to the combination of the opening 306 in the network camera holder 300 and the data cable 108, the network camera 100 is rotatable around its center axis. After installing the network camera 100 in the network camera holder 300, it is possible to adjust the viewing direction of the network camera 100 whenever desired by rotating the camera around its center axis.

The image acquisition part 102 is tiltable around an axis which is essentially perpendicular to the center axis of the network camera 100. It is possible to adjust the tilting direction of the network camera 100 whenever desired.

In one embodiment, the tilting motion of the image acquisition part 102 may be motor driven.

In another embodiment, the rotation of the image acquisition part 102 together with the image processing part 104, may be motor driven.

In another embodiment, the tilting motion of the image acquisition part 102, as well as the rotation of the image acquisition part 102 together with the image processing part 104, may be motor driven.

What is claimed is:

1. A network camera assembly comprising:
   an image acquisition part,
   an image processing part configured to remain fixed with respect to a first axis, wherein the image processing part contains a CPU,
   a flat cable connecting a first end of the image acquisition part with a first end of the image processing part;
   an inlet for an external data cable arranged at a second end of the image processing part; and
   a network camera holder arranged to partially enclose the image acquisition part and substantially enclose said image processing part, wherein the image acquisition part and the image processing part are connected;
   wherein the image acquisition part is tiltable around the first axis in relation to the image processing part, wherein the image processing part is rotatably inserted into the network camera holder for rotation relative to the network camera holder, wherein the network camera holder is adapted to enable rotation of the image processing part together with the image acquisition part around a second axis, and wherein the first and second axes are essentially perpendicular to each other.

2. The network camera assembly according to claim 1, wherein the image processing part comprises an image processing means and a network interface.

3. The network camera assembly according to claim 1, further comprising a housing enclosing said image processing part comprising at least one protrusion on an outside of the housing protruding in a plane essentially orthogonal to the second axis, the network camera holder further comprising, on an inside of the network camera holder, a supporting flange having at least one notch, wherein the at least one notch is adapted to receive the at least one protrusion and wherein the at least one flange is arranged to secure the image processing part in the network camera holder.

4. The network camera assembly according to claim 1, further comprising a housing enclosing said image processing part, the housing comprising, on an outside of the housing, a supporting flange having at least one notch, the network camera holder further comprising, on an inside of the network camera holder, at least one protrusion protruding in a plane essentially orthogonal to the second axis, wherein the at least one notch is adapted to receive the at least one protrusion, and wherein the at least one protrusion is arranged to secure the image processing part in the network camera holder.

5. The network camera assembly according to claim 1, wherein the network camera holder is arranged to be attached to a panel element.

6. The network camera assembly according to claim 2, further comprising a housing enclosing said image processing part comprising at least one protrusion on an outside of the housing protruding in a plane essentially orthogonal to the second axis, the network camera holder further comprising, on an inside of the network camera holder, a supporting flange having at least one notch, wherein the at least one notch is adapted to receive the at least one protrusion and wherein the at least one flange is arranged to secure the image acquisition part in the network camera holder.

7. The network camera assembly according to claim 2, further comprising a housing enclosing said image processing part, the housing comprising, on an outside of the housing, a supporting flange having at least one notch, the network camera holder further comprising, on an inside of the network camera holder, at least one protrusion protruding in a plane essentially orthogonal to the second axis, wherein the at least one notch is adapted to receive the at least one protrusion, and wherein the at least one protrusion is arranged to secure the image acquisition part in the network camera holder.

8. The network camera assembly according to claim 1, wherein the flat cable is configured such that optimum flexibility of the flat cable is applied when bending around the first axis.

9. The network camera assembly according to claim 1, wherein the image processing part has an elongated shape and extends along the second axis.

* * * * *